United States Patent Office 3,309,405
Patented Mar. 14, 1967

3,309,405
1,2-BIS-AMINOMETHYL-CYCLOBUTANE
Otto Bayer, Burscheid, and Rudolf Schroter, Werner Siefken, and Kuno Wagner, Leverkusen, Germany, assignors to Farbenfabriken Bayer Aktiengesellschaft, Leverkusen, Germany, a corporation of Germany
No Drawing. Filed Nov. 23, 1964, Ser. No. 413,355
Claims priority, application Germany, Sept. 22, 1959, F 29,433
1 Claim. (Cl. 260—563)

This application is a continuation-in-part of the copending application Ser. No. 57,622 filed Sept. 22, 1960, and now abandoned. The invention relates to a new organic diamine and a process for its preparation.

The object of the invention is to provide the 1,2-Bis-aminomethyl-cyclobutane and a process for the preparation of this diamine.

It has been found that 1,2-bis-aminomethyl-cyclobutane can be prepared in a simple manner and high yield by dimerizing acrylonitrile and hydrogenating the formed 1,2-di-(cyano)-cyclobutane.

The reaction is illustrated by the following equation:

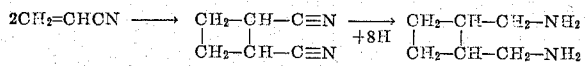

The hydrogenation of 1,2-di-(cyano)-cyclobutane can be carried out in liquid ammonia at a hydrogen pressure of about 150 atmospheres in the presence of a catalyst, preferably a Raney nickel catalyst, and an organic solvent, heating up to about 90 to 120° C. and subsequently pumping in the dinitrile at the rate at which it is hydrogenated. After the hydrogenation is finished the mixture is cooled and filtered after the pressure has been released. The filtrate is freed from ammonia and solvent and afterwards fractionated.

The diamine resulting from this catalytic hydrogenation is a water white liquid having a boiling point of about 83° C. to about 85° C. at 14 mm. Hg.

*Preparation of 1,2-bis-aminomethyl-cyclobutane*

(a) Cyclobutane-1,2-dinitrile is prepared according to the description disclosed in German Patent 1,081,008 and by E. C. Coyner and W. S. Hillman, in American Soc. 71,324, 1924.

(b) Production of 1,2-bis-aminomethyl-cyclobutane: 200 cc. of tetrahydrofurane, 200 cc. of liquid ammonia, 20 grams of Raney nickel and 20 grams of calcium oxide are placed in a high-pressure autoclave of a capacity of about 1.4 litres. Hydrogen is passed in up to a pressure of 150 atmospheres and the autoclave is heated to 90° C. The stirrer mechanism is started and a solution of 150 grams of 1,2-dicyano-cyclobutane in 200 cc. of tetrahydrofurane is slowly pumped in at the rate at which the dinitrile is hydrogenated, i.e. in such a manner that any consumption of hydrogen can no longer be determined after stopping the pumping action. Depending on the quality of the dinitrile the introduction thereof requires 2–3 hours. In accordance with the consumption rate the hydrogen is replenished in such a manner that a pressure between 100 and 150 atmospheres is maintained. The temperature is raised up to 120° C. Finally, the pump and delivery pipes are rinsed with about 70 cc. of tetrahydrofurane, and the mixture is hydrogenated at 120° C. and 150 atmospheres for another hour whereupon an appreciable absorption of hydrogen is no longer observed. The mixture is allowed to cool, the pressure released and the mixture filtered. The filtrate is heated at a reflux condenser until the major quantity of ammonia is evaporated and the solvent is then separated off by fractionating at atmospheric pressure. After fractionating the residue at subatmospheric pressure there are obtained, after a small amount of first runnings, 110–125 grams of bis-aminomethyl-cyclobutane (B.P. 89–91° C./ 20 mm. Hg) in a purity of 97–99%. The yield corresponds to 68–78% of the theoretical.

The new 1,2-bis-aminomethyl-cyclobutane is an intermediate for the production of the corresponding 1,2-di-(isocyanatomethyl)-cyclobutane. This isocyanate finds a preferred field of application in the preparation of polyurethane compositions being used for the production of gear wheels, accumulation bladders, thermal and sound insulation as well as coatings or lacquer for refrigerators, kitchen equipment, furniture, parquet floors and the like.

We claim:
1,2-bis-aminomethyl-cyclobutane.

References Cited by the Examiner
UNITED STATES PATENTS

| | | | |
|---|---|---|---|
| 2,818,431 | 12/1957 | Beegle | 260—563 |
| 2,894,038 | 7/1959 | Bartlett et al. | 260—563 X |
| 2,945,063 | 7/1960 | Quinn et al. | 260—563 |
| 3,012,994 | 12/1961 | Bell et al. | 260—563 X |
| 3,096,360 | 7/1963 | Sennewald | 260—464 |
| 3,192,262 | 6/1965 | Schreyer | 260—653 |

FOREIGN PATENTS 1,001,257  12/1954  Germany.

OTHER REFERENCES

Coyner et al., J.A.C.S., volume 71, pages 324–326 (1949).
Lambert et al., J. Chem. Soc. (London), volume of 147, pages 1517–1519.
Houben-Weyl, "Methoden Der Organischen Chemie," volume 11/1, page 569 (1957).

CHARLES B. PARKER, *Primary Examiner.*
F. D. HIGEL, *Assistant Examiner*